US006421070B1

(12) United States Patent
Ramos et al.

(10) Patent No.: US 6,421,070 B1
(45) Date of Patent: Jul. 16, 2002

(54) SMART IMAGES AND IMAGE BOOKMARKING FOR AN INTERNET BROWSER

(75) Inventors: Daniel O. Ramos, Beaverton; Brian T. MacIntosh, Oswego; Geoffrey B. Rhoads, West Linn, all of OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/165,142

(22) Filed: Oct. 1, 1998

Related U.S. Application Data

(63) Continuation-in-part of application No. 08/746,613, filed on Nov. 12, 1996, now Pat. No. 6,122,403.
(51) Int. Cl.$^7$ ................................................ G09G 5/00
(52) U.S. Cl. ...................................... 345/763; 382/232
(58) Field of Search ................................ 345/339, 334, 345/349, 356, 357, 329, 330, 764, 803, 838, 817; 707/501, 513; 382/232, 181; 380/4, 1

(56) References Cited

U.S. PATENT DOCUMENTS

| 5,428,601 A | | 6/1995 | Moskovitz |
| 5,493,677 A | * | 2/1996 | Balogh et al. ............ 707/104.1 |

(List continued on next page.)

FOREIGN PATENT DOCUMENTS

| EP | 0234885 | 4/1991 |
| EP | 0 936 531 | 8/1999 |
| WO | WO 94/27228 | 11/1994 |

OTHER PUBLICATIONS

IBM Technical Diclosure Bulletin, "Efficient 3D method for Displaying Browser Uniform Resource Locator Bookmarks" Jan. 1, 1998.*

(List continued on next page.)

*Primary Examiner*—Raymond J. Bayerl
*Assistant Examiner*—Tadesse Hailu
(74) *Attorney, Agent, or Firm*—Elmer Galbi

(57) ABSTRACT

Web pages which contain images are displayed by a browser. A special visual indicia is placed on any the images which contain a digital watermark so that a user can know that the image contains hidden watermark data. By clicking on the indicia which is placed on the image, the user will be linked to the web page identified by the watermark data hidden in the image. Such a link will be established without the web page designer having to include a tag in the web pages design which displayed the original image. The present invention also opens a separate window which contains a thumbnail of each image in a web page. If a user right clicks on one of the thumbnails in this window the image will be added to a list of images in a special image bookmark file. When a user opens the bookmark web page, thumbnails of all the stored images in the bookmark file are displayed. A user can recall the web page which originally contained the image by clicking on the thumbnail.

6 Claims, 6 Drawing Sheets

U.S. PATENT DOCUMENTS

| | | | |
|---|---|---|---|
| 5,634,012 A | 5/1997 | Stefik | 395/239 |
| 5,646,997 A | 7/1997 | Barton | 380/23 |
| 5,652,714 A | 7/1997 | Peterson | 364/550 |
| 5,657,462 A | 8/1997 | Brouwer | 395/336 |
| 5,822,432 A | 10/1998 | Moskowitz | |
| 5,841,978 A | 11/1998 | Rhoads | 709/217 |
| 5,848,424 A | 12/1998 | Scheinkman | 707/501 |
| 5,852,673 A | 12/1998 | Young | 382/164 |
| 5,862,260 A * | 1/1999 | Rhoads | 382/232 |
| 5,884,056 A * | 3/1999 | Steele | 395/339 |
| 5,889,868 A | 3/1999 | Moskowitz | |
| 5,903,892 A * | 5/1999 | Hoffert et al. | 707/10 |
| 5,905,800 A * | 5/1999 | Moskowitz et al. | 380/28 |
| 5,920,861 A | 7/1999 | Hall | 707/9 |
| 5,920,878 A | 7/1999 | DeMont | 707/513 |
| 5,956,716 A | 9/1999 | Kenner | 707/10 |
| 5,963,964 A * | 10/1999 | Nielsen | 707/501 |
| 6,049,627 A * | 4/2000 | Becker et al. | 382/181 |
| 6,122,403 A * | 9/2000 | Rhoads | 382/223 |
| 6,131,162 A * | 10/2000 | Yoshiura et al. | 713/176 |
| 6,182,218 B1 * | 1/2001 | Saito | 713/76 |
| 6,226,618 B1 * | 5/2001 | Downs et al. | 705/1 |
| 6,243,480 B1 | 6/2001 | Zhao | |

OTHER PUBLICATIONS

Digimarc corporation "Digimarc Turns Online Images into Powerful Marketing Agents," pp. 1–3, Jun. 1998.*

Proceedings of the 2nd ACM international conference on digital libraries "Secure Distribution of Watermarked Images for a Digital Library of Ancient Papers", pp 123–130, 7/97.*

Digimarc corporation, "A Picture Says A Thousand Words–Two of Them Can Now Be Your First And Last Names" 9/97.*

Digimarc Corporation, "Digimarc Kiks Off MarcSpider Service"pp 1–2, 8/97.*

U.S. patent application Ser. No. 09/526,982, Rhoads, filed Mar. 15, 2000.

U.S. patent application Ser. No. 09/507,096, Davis, filed Feb. 17, 2000.

U.S. patent application Ser. No. 60/191,778, Ramos, filed Mar. 24, 2000.

U.S. patent application Ser. No. 09/636,102, Ramos, filed Aug. 10, 2000.

U.S. patent application Ser. No. 09/503,881, Rhoads, filed Feb. 14, 2000.

U.S. patent application Ser. No. 09/571,422, Rhoads, filed May 15, 2000.

U.S. patent application Ser. No. 09/531,078, Rhoads, filed Mar. 18, 2000.

* cited by examiner

Display Screen

SMART IMAGES AND IMAGE BOOKMARKING FOR AN INTERNET BROWSER

RELATED APPLICATIONS

This application is a continuation in part of application Ser. No. 08/746,613 filed Nov. 12, 1996 which has been issued as U.S. Pat. No. 6,122,403.

FIELD OF THE INVENTION

The present invention relates to the internet and more particularly to browsers that are used to display web pages obtained from the internet.

BACKGROUND OF THE INVENTION

There are numerous commercially available programs called "browsers" that facilitate accessing and displaying data. The two leading commercially available browsers are the "Netscape Communicator" which is distributed by Netscape Corporation of Mountain View, Calif. and the "Internet Explorer" browser that is distributed by Microsoft corporation of Redmond, Wash.

Browsers allow one to utilize the internet to access web pages located at remote sites. A browser displays web pages in a window on a display device. The web pages that are displayed can contain both text and images.

Technology called stenography had been developed which allows one to store digital data in an image. Such data is frequently termed a "digital watermark". The digital data is not visible when an image containing such data is displayed with a conventional browser; however, the image can be passed through a special program which can detect and read the hidden data. Systems for storing digital data in images and for then reading such data from the images are for example shown in U.S. Pat. No. 5,636,292 and in U.S. Pat. No. 5,748,783. Such technology is also discussed in the "Communications of the ACM" published July 1998 Vol. 41. No. 7 pages 31 to 77.

The present invention provides programs which works with a browser to provide functions that are not performed by prior programs. A typical web page displayed by a browser contains several images. With a conventional browser, a user can not visually determine if any of the images displayed on a web page contain a watermark.

SUMMARY OF THE INVENTION

The present invention is an adjunct to a convention browser which displays web pages that contain images. With the present invention a special visual indicia is placed on images which contain a digital watermark so that a user can know that the image contains hidden watermark data. By clicking on the indicia which is placed on the image, the user will be linked to the web page identified by the watermark data hidden in the image. Such a link will be established without the web page designer having to include a tag in the web page which displays the original image. The present invention also opens a separate widow which contains a thumbnail of each image in a web page. If a user right clicks on one of the thumbnails in this window the image will be added to a list of images in a special image bookmark file. When a user opens the bookmark web page, thumbnails of all the stored images in the bookmark file are displayed. A user can recall the web page which originally contained the image by clicking on the thumbnail.

DESCRIPTION OF PREFERRED EMBODIMENT

Figure 1:
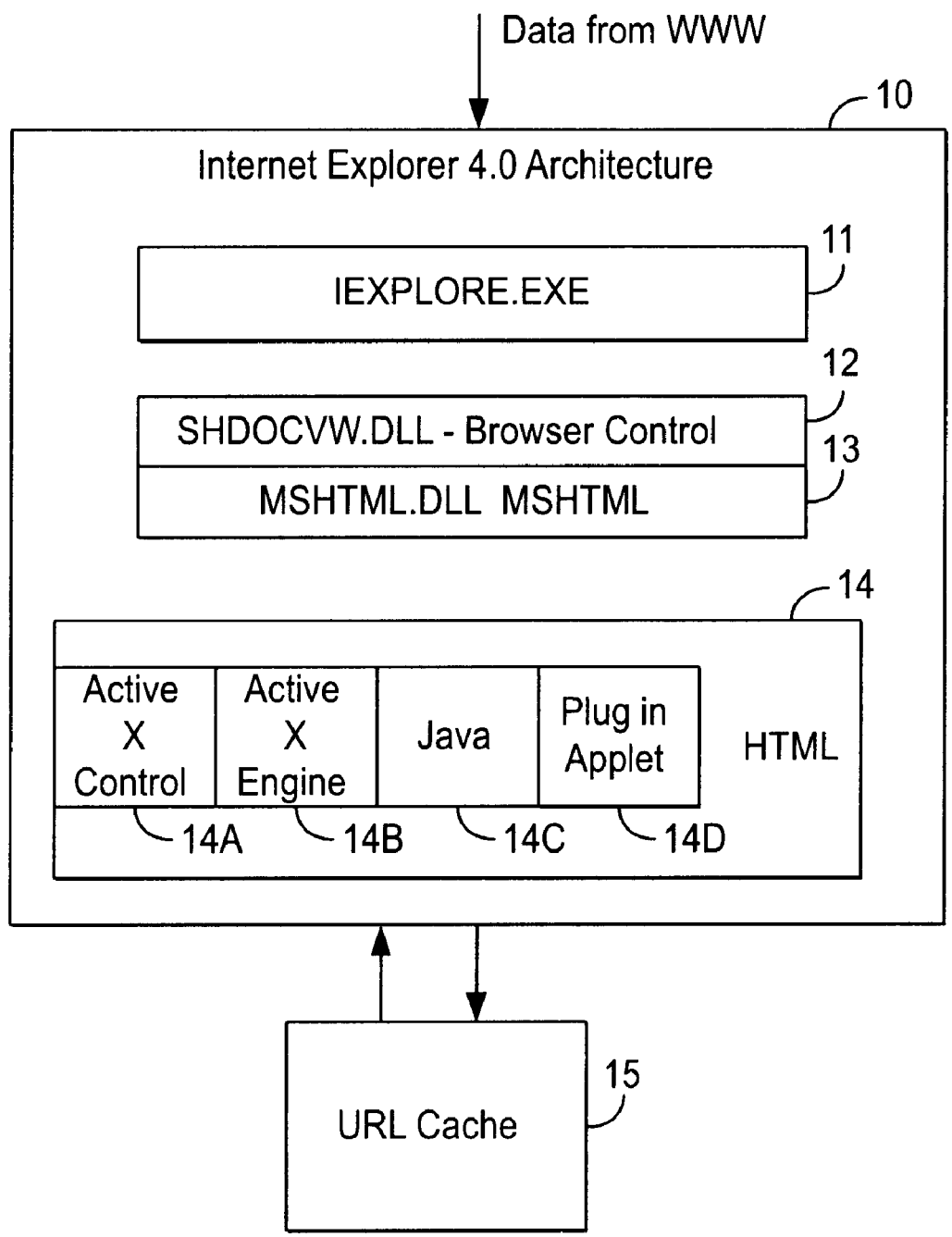
FIG. 1 is a block diagram of a prior art browser.

The preferred embodiment of the invention is implemented utilizing what is known in the art as "helper application" for the Internet Explorer 4.0 browser. The Internet Explorer 4.0 browser is commercially distributed by Microsoft Corporation. FIG. 1 is a block diagram of the commercially available Internet Explorer 4.0 browser 10. Browser 10 provides a mechanism for receiving and displaying data (called Web Pages) received from the World Wide Web (which is often referred to as W W W).

The preferred embodiment of the invention described herein is designed to operate based on watermarks which have a particular format designed by Digimarc Corporation. Many of the commercially available programs which can insert watermarks in images and which can detect watermarks in images utilize this watermark format. For example, the Digimarc format is used by the following commercially available programs: "Adobe PhotoShop" Versions 4.0 and 5.0 and "Adobe ImageReady" Version 1.0 which are marketed by Adobe Corporation, "CorelDRAW" Versions 7 and 8, and "Corel PHOTO-PAINT" Versions 7 and 8 which are marketed by Corel Corporation, and Micrografx Webtricity" Versions 1 and 2, "Micrografx Graphics Suite 2", and "Micrografx Picture Publisher" Versions 7 and 8 which are marketed by Micrografx Corporation.

The base program in the Internet Explorer 4.0 browser, that is, the program which begins the operation of the browser 10 is IEXPLORE.EXE 11 which is shown in FIG. 1. Program 11 calls the web browser control dynamic link library SHDOCVW.DLL 12. As stated in the documentation of the Internet Explorer provided by Microsoft SHDOCVW.DLL 12 "supplies the functionality associated with navigation, in-place linking, favorites and PICS support." SHDOCVW.DLL 12 in turn hosts or calls the MSHTML.DLL 13 dynamic link library. MSHTML.DLL "performs the HTML parsing and rendering" and also "exposes the HTML document through the Dynamic HTML Object Model" 14. The HTML Object Model 14 hosts the Active X Control 14A, the Active X Engine 14B, the JAVA VM 14C and the Plug In Applet 14D. The various components in browser 10 store and retrieve information from URL Cache 15. The operation and function of the various components of the Internet Explorer browser are described in the publicly available literature (and on the web site) provided by Microsoft Corporation.

Figure 2:
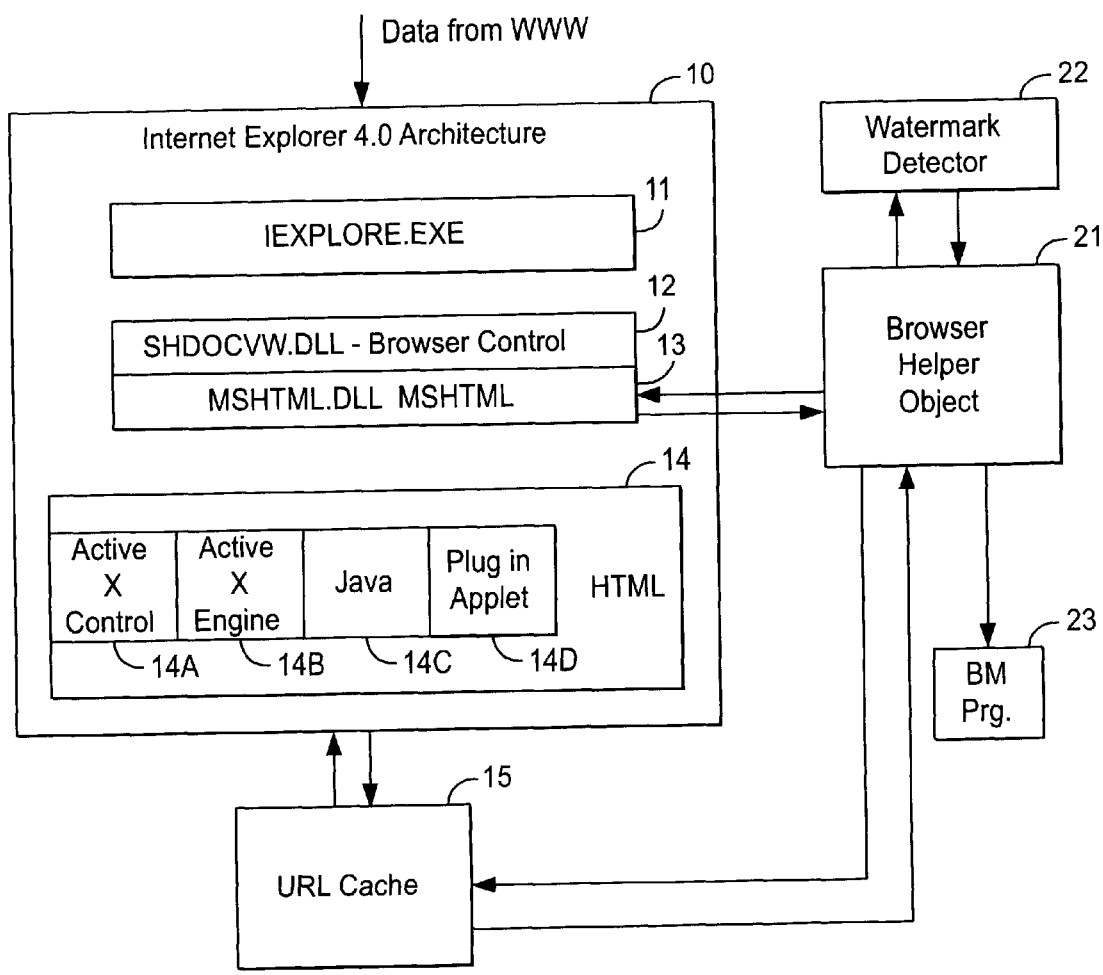
FIG. 2 is a block diagram of an embodiment of the present invention

The preferred embodiment of the invention adds a browser helper object 21 and two other programs 22 and 23 as shown in FIG. 2. Program 22 is a conventional program designed to detect a watermark in an image. One example of such a program is shown in U.S. Pat. No. 5,636,292. Another program for detecting watermarks is shown in U.S. Pat. No. 5,689,587. The browser helper object 21 interfaces with the dynamic link library MSHTML.DLL 13 and with the URL cache 15.

Figure 4:
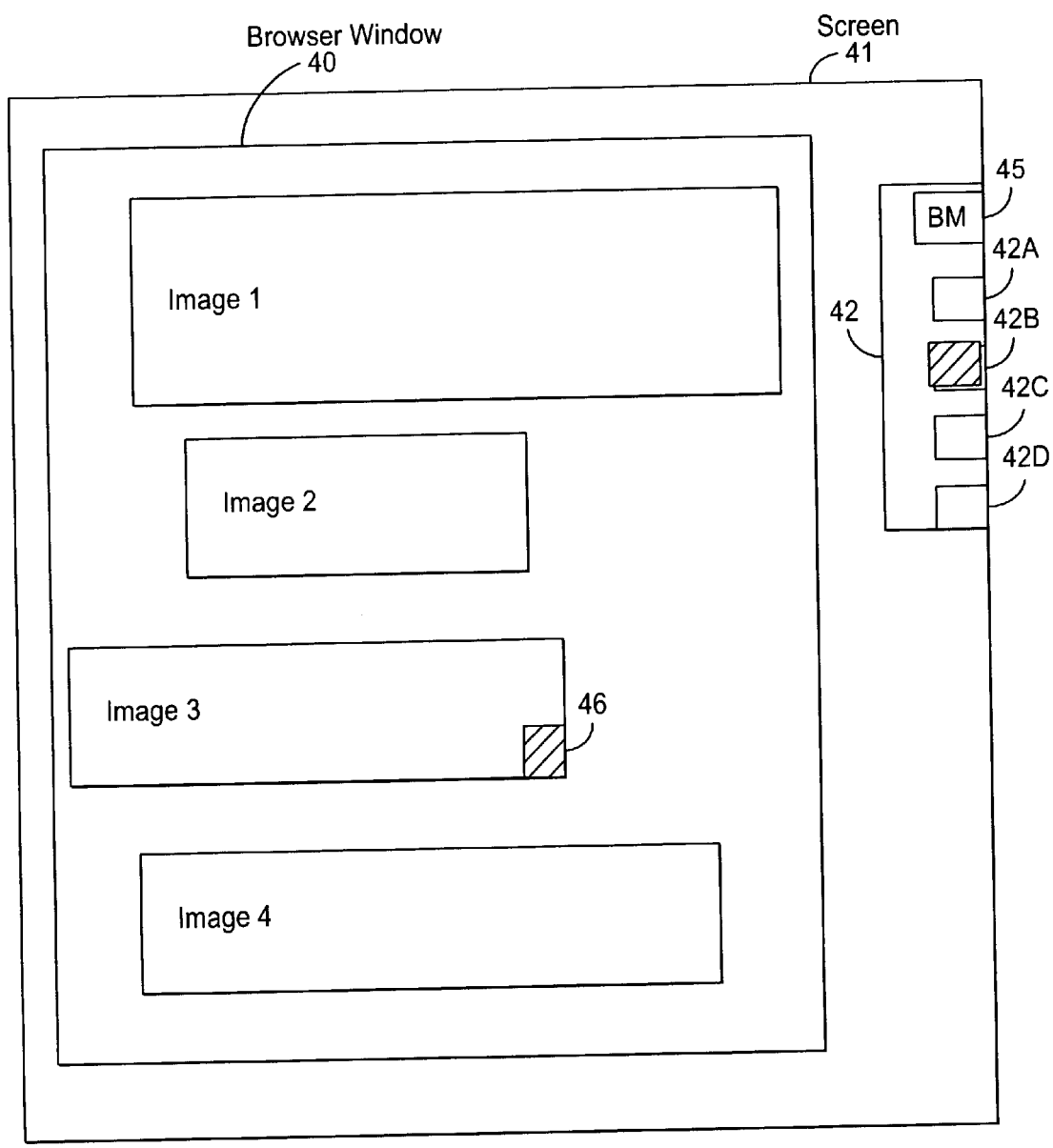
FIG. 4 is a diagram of a display screen of the preferred embodiment.

FIG. 4 illustrates an example of a web page being displayed in a window 40 on display screen 41 by browser 10. The example shown in FIG. 4 has four images designated image 1, image 2, image 3 and image 4. It should understood that the number of images and the placement of the images varies in each web page displayed and it is determined by the person who creates a web page. Furthermore, text may be interspersed with the images. The example shown in FIG. 4 is a simple example of a web page which is herein used to illustrate the operation of the present invention.

The present invention detects which images on a web page contain a watermark. The images which contain watermarks are flagged or noted by means of an indicia which is added to the lower right hand corner of any images that contain watermarks. In the example shown in FIG. 4, image 3 contains a watermark and thus indicia 46 appears on the lower right hand corner of the image. Indicia 46 could for example be a logo which identifies a particular company or it could be any other easily identified mark or symbol. It could be as simple as the letters WM or it could be a small multicolored image. The indicia which is displayed is stored in GIF file (Graphic Interchange Format file) and referenced by HTML code (HyperText Markup Language code) which causes the indicia to be displayed.

The data in the watermarks (which have the previously defined format) includes a particular HTML address. With the present invention if a user clicks on the indicia 46, a link is created and executed to a particular web page on a particular server herein identified as "www.digimarc.com/cgi-bin".

The program 23 also opens a separate window 42 and it places a thumbnail (i.e. a reduced version) of each image in window 42. In the example shown in FIG. 4, thumbnails 42A, 42B, 42C and 42D are small versions of images 1 to 4 respectfully.

Figure 5:
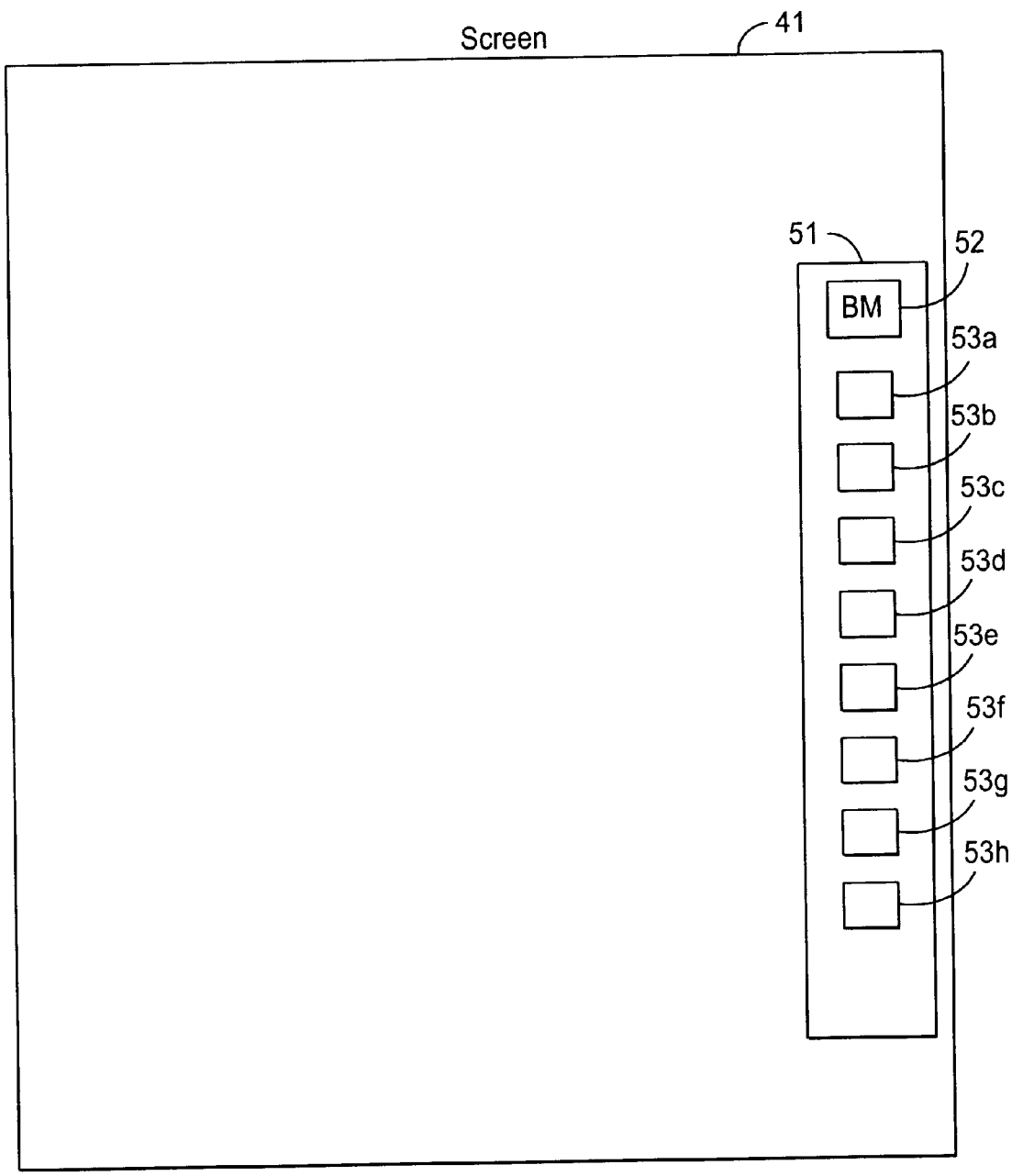
FIG. 5 is a diagram of a display screen showing bookmarks.

Program 23 also creates an image or "button" 45 which contails the symbol BM. If a user right clicks on one of the images in window 42, that image is saved as a bookmark. If at a later time a user clicks on the BM image 45, the system displays a list of the previously saved images 53a to 53h as shown in FIG. 5. When a user clicks on one of the displayed images 53a to 53h, a link is executed to the page from which the image originated, and thus that page is again displayed by the browser 10.

Figure 3:
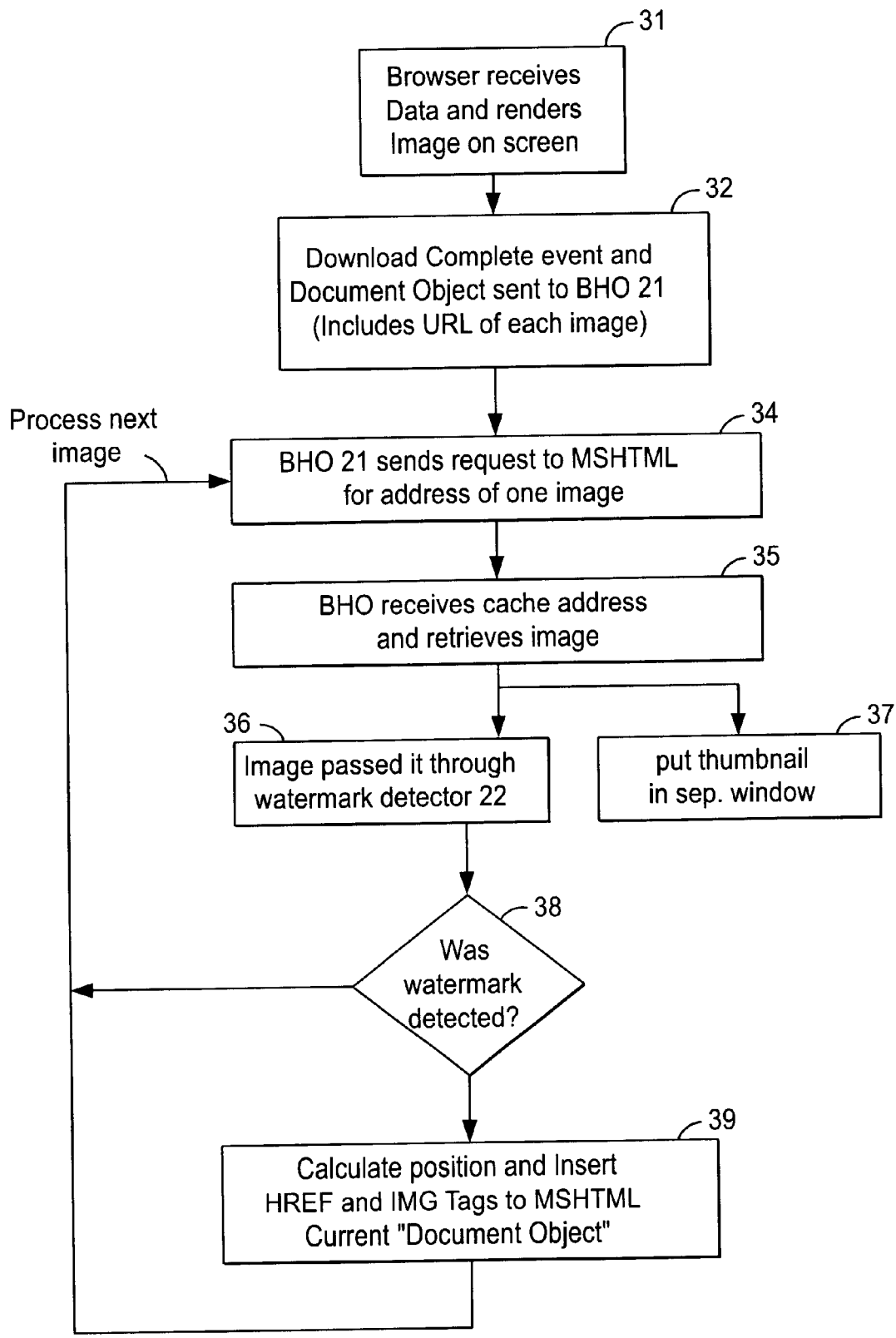
FIG. 3 is flow diagram of the operation of the preferred embodiment

FIG. 3 is a block flow diagram of the operation of the browser helper object 21 and program 22. Block 31 indicates that initially the browser 10 receives data and it renders images in window 40 on the screen 41 as is normal for the operation of the browser 10. Block 32 indicates that when the download operation is complete, MSHTML.DLL 13 sends a "Download complete event" and a "Document Object" to Browser helper Object 21. The Document Object includes the URL addresses of each of the images in the page that is displayed. The characteristics of a Download Complete Event and a Document Object is explained in the documentation provided by Microsoft Corporation. Block 34 indicates that Browser Helper 21 sends a request to MSHTML for the address in cache 15 of one of the URL addresses which it previously received. The documentation supplied by Microsoft corporation explains how the above operations are performed.

Block 35 indicates that when browser helper 21 receives a Download Compete Event from MSHTML.DLL 13, the browser helper 21 queries the "Document Object". The images which are in the page being displayed are available to the browser helper 21 in the current "Document". The browser helper 21 retrieves the image data from the URL cache 15 and processes it as follows: The image is passed through watermark detector program 22 to determine if the image contains a watermark and bookmark program 23 places a thumbnail of the image in window 32.

As indicated by block 38, if no watermark is detected (and if this is not the last image which appears in the window being displayed) the program flow returns to block 34 and the process repeats for another image. If the image being processed is the last image in a window the process stops and does not begin again until browser helper 21 receives another "download Compete Event" signal.

If a watermark is detected by watermark detector 22, the process proceeds to block 39. As indicated by block 39, in this event helper Program 21 calculates the position of the lower right hand corner of the image and "inserts" a HREF and an IMG tag to the current document object of MSHTML.DLL. In response to the HREF and IMG tag, MSHTML.DLL will display an indicia such as indicia 46 in the lower right hand corner of the image with the watermark. The browser helper can calculate the lower right hand corner of the image where the indicia 46 is to be inserted from the location data of the image. The location where the image is to be inserted is given in the HREF command.

The general format of such HREF and IMG tags is entirely conventional and well known. Likewise the technique for "inserting" a HREF and an IMG tag to the current document object of MSHTML.DLL is well known and conventional.

When watermark detector 22 determines that a particular image contains a watermark, the browser helper 21 inserts tags to the MSHTML.DLL 13 which then superimposes indicia 46 over the image being displayed by the browser 10.

An Active X browser control program publicly available from Microsoft Corporation is used to display the thumbnails in widow 42 as shown in FIG. 4. The Active X browser control program is also used to display the image bookmarks as shown in FIG. 5.

Figure 6:
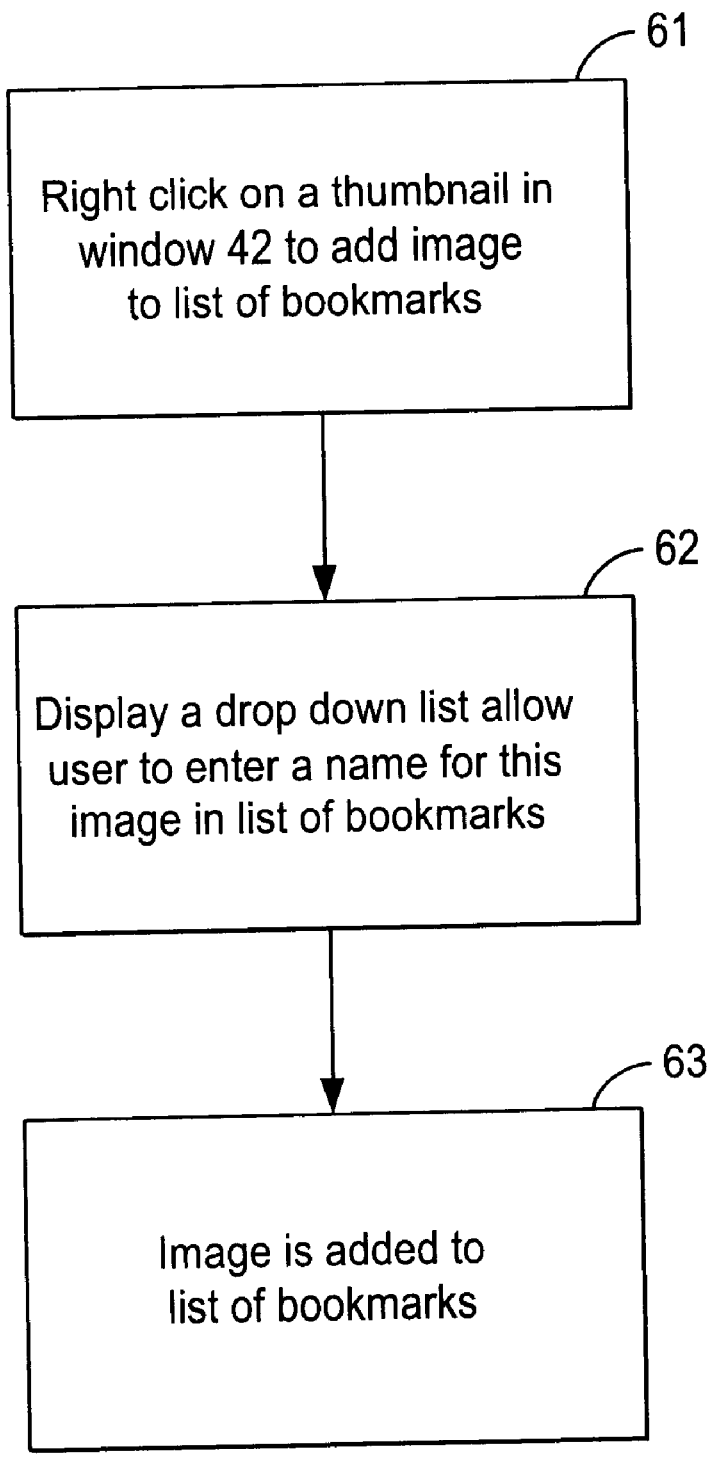
FIG. 6 is a flow diagram of the operation of the bookmark program

A block diagram of the program used to add images to the list of image bookmarks is shown in FIG. 6. With reference to FIG. 4, if a user would like to add one of the images 1 to 4 to a list of images that the user has bookmarked, the user would right clicks on the thumbnail of that image which shown in widow 42 (block 61). As a result of the right click, a drop down window (not specifically shown) will appear asking for the name the user wants to associate with the image (block 62). It is noted that the use of drop down widows to add information is conventional and well known. When the drop down window appears, the user enters a name and the image is added to the list of bookmarks with the name entered.

Similar HTML code display bookmarks as shown in FIG. 5. HTML code which displays bookmarks is conventional.

Another feature that can be added to the preferred embodiment is that window 42 can be used to display a visual history of the pages that have been viewed. That is one could include in window 42 a button that would allow one to scroll back through the thumbnails previously displayed in the window.

While the invention has been showed with respect to a preferred embodiment thereof, it should be understood that various changes and modifications can be made without departing from the spirit of the invention. The scope of applicant's invention is defined by the following claims.

We claim:

1. A system including
   a browser for displaying a web page which contains multiple images, some of which contain digital watermarks, and a browser helper program for detecting which of said images on said web page contain digital watermarks and for adding indicia to each of said images which contains a digital watermark.

2. The system recited in claim 1 including means for opening a separate window and displaying in said window a thumbnail of each image displayed on a web page.

3. The system recited in claim 1 including means for generating a list of image bookmarks of said images and for allowing a user to add images to said list of image bookmarks.

4. The system recited in claim 3 including means for directing a browser to the source of an image selected from the list of images in said list of image bookmarks.

5. A system including a browser program which can display on a screen a web page which includes multiple images, a browser helper program which opens a separate window on said screen and which displays a thumbnail of each image on the page being displayed by said browser, and a watermark detection program wherein said browser helper passes each image on a web page being displayed through said watermark detection program, and wherein said watermark helper program adds an indicia to each images on said web page which contains a watermark.

6. The system recited in claim 5 which includes a program which can store a list of image bookmarks and which can display said bookmarks upon demand by a user.

* * * * *